(12) United States Patent
Sugimoto et al.

(10) Patent No.: US 9,365,954 B2
(45) Date of Patent: Jun. 14, 2016

(54) POLYPHENYLENE SULFIDE FIBER, FILTER CLOTH COMPRISING POLYPHENYLENE SULFIDE FIBER, AND METHOD FOR PRODUCING POLYPHENYLENE SULFIDE FIBER

(71) Applicant: Toray Industries, Inc., Tokyo (JP)

(72) Inventors: Takeshi Sugimoto, Iyo-gun (JP); Keiji Kaiho, Iyo-gun (JP); Koichiro Maeda, Iyo-gun (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 14/378,542

(22) PCT Filed: Feb. 19, 2013

(86) PCT No.: PCT/JP2013/053967
§ 371 (c)(1),
(2) Date: Aug. 13, 2014

(87) PCT Pub. No.: WO2013/125514
PCT Pub. Date: Aug. 29, 2013

(65) Prior Publication Data
US 2015/0013296 A1  Jan. 15, 2015

(30) Foreign Application Priority Data

Feb. 24, 2012 (JP) .................................. 2012-038367
Jan. 29, 2013 (JP) .................................. 2013-014099

(51) Int. Cl.
*B01D 39/00* (2006.01)
*D01F 6/76* (2006.01)
*D01D 5/12* (2006.01)
*D04H 1/4326* (2012.01)
*D04H 1/46* (2012.01)
*D04H 1/492* (2012.01)
*B01D 39/08* (2006.01)
*B29C 47/00* (2006.01)

(52) U.S. Cl.
CPC .............. *D01F 6/765* (2013.01); *B01D 39/083* (2013.01); *B29C 47/0014* (2013.01); *D01D 5/12* (2013.01); *D04H 1/4326* (2013.01); *D04H 1/46* (2013.01); *D04H 1/492* (2013.01); *B01D 2239/0618* (2013.01)

(58) Field of Classification Search
CPC .. B01D 39/83; B01D 2239/618; D01F 6/765; D01D 5/12
USPC .............. 55/516, 520, 528; 264/164; 528/388
See application file for complete search history.

(56) References Cited

FOREIGN PATENT DOCUMENTS

| CN | 101275309 A | 10/2008 |
|---|---|---|
| JP | H04222217 A | 8/1992 |
| JP | 2764911 B2 | 6/1998 |
| JP | 2003-221731 A | 8/2003 |
| JP | 2003221731 A * | 8/2003 |
| JP | 2004-263323 A | 9/2004 |
| JP | 2004-263332 | 9/2004 |
| JP | 2005-146428 A | 6/2005 |
| JP | CN 101275309 A * | 10/2008 |
| JP | 2008-266869 A | 11/2008 |
| JP | 2008266869 A * | 11/2008 |
| JP | 2010-196187 | 9/2010 |

OTHER PUBLICATIONS

International Search Report in PCT International Application No. PCT/JP2013/053967, dated May 14, 2013.
First Office Action in Chinese Patent Application No. 201380010529.5 dated Apr. 8, 2015.
Extended European Search Report in European Patent Application No. 13751597.9, dated Aug. 12, 2015.

* cited by examiner

*Primary Examiner* — Jason M Greene
*Assistant Examiner* — Karla Hawkins
(74) *Attorney, Agent, or Firm* — Venable LLP; Michael A. Sartori; David M. Klecyngier

(57) ABSTRACT

The present invention provides: a polyphenylene sulfide fiber that has excellent tensile strength; and a polyphenylene sulfide fiber that decreases in toughness to a small extent even when subjected to a long-term heat treatment and has excellent tensile strength. The polyphenylene sulfide fiber according to the present invention is characterized by comprising a polyphenylene sulfide resin having a weight average molecular weight of 50000 to 80000 inclusive, having a rigid amorphous content of 50% or more, and having a crystal size of 5 nm or more in the direction of a (111) crystal plane.

4 Claims, No Drawings

POLYPHENYLENE SULFIDE FIBER, FILTER CLOTH COMPRISING POLYPHENYLENE SULFIDE FIBER, AND METHOD FOR PRODUCING POLYPHENYLENE SULFIDE FIBER

TECHNICAL FIELD

The present invention relates to a polyphenylene sulfide fiber.

BACKGROUND ART

A polyphenylene sulfide (hereinafter also referred to as PPS for short) resin has suitable properties as an engineering plastic, such as excellent heat resistance, barrier property, chemical resistance, electrical insulation property and resistance to wet heat, and is used in various electrical parts, electronic parts, machine parts, automobile parts, films and fibers, etc., such as those for injection molding and extrusion molding.

PPS materials are widely used in, for example, filter cloths used for various industrial filters such as a bag filter for collecting dust in waste gas. An example of such a filter cloth is one that is obtained by stacking PPS staple fibers on a base fabric produced from a yarn spun from PPS staple fibers and needle-punching the laminate to unify. Such a filter cloth is used to collect dust in the waste gas so that the waste gas containing no dust is exhausted to the outside. It is important to continue to keep an unclogged state for a long period of time, and therefore the properties of such a filter cloth have always been desired to have a longer life.

On the other hand, in order to suppress the filter cloth from clogging and make the properties of the filter cloth have a longer life, an effective way is to cause the attached dust to be efficiently detached from the filter cloth. For example, if a filter cloth of a bag filter clogs, it becomes no longer possible to exhaust waste gas from the incineration system. Therefore, it is necessary to stop the incineration system and change filter cloths. That is, if it is possible to blow the dust off efficiently before the filter cloth clogs, it would be possible to increase the life of the filter cloth and possible to run the incineration system continuously for a long period of time.

For a bag filter, in many cases, a pulse jet method is employed as a method to cause the dust attached to the filter cloth to be efficiently detached. The pulse jet method is a method by which to vibrate the filter cloth by periodically blowing a high-speed airflow on the filter cloth and blow the attached dust off the surface of the filter cloth, before the dust attached to the surface of the filter cloth accumulates. Such a pulse jet method makes it possible to blow the dust off, but, needless to say, the high-speed airflow, which is applied as an external force, is likely to reduce the mechanical strength of the filter cloth with time. This has a problem in that, when the external force is periodically applied, in the case where the mechanical strength of the filter cloth or the dimension stability of the filter cloth is not high enough, the filter cloth is broken and becomes no longer able to function as a bag filter.

Conventionally, for the purpose of improving the mechanical strength and dimension stability of PPS fibers, various proposals have been made. For example, there has been proposed a technique to, by melt-spinning PPS and thereafter drawing the obtained undrawn yarn to 2 to 7 times its original length below the melting point of the PPS and then treating the yarn at a temperature equal to or higher than the melting point of the PPS, increase tensile strength, knot tenacity and loop tenacity to increase flexing abrasion resistance and resistance to fatigue from flexing (refer to Patent Document 1). Furthermore, there has been proposed another technique to obtain a nonwoven fabric having excellent dimension stability by using, in a nonwoven fabric of a PPS fiber, a PPS fiber provided with certain crimp (refer to Patent Document 2).

Meanwhile, waste gas in the incineration system is hot, and exhaust gas contains gas that chemically degrades the PPS. That is, it has been pointed out that the filter cloth for use in a bag filter is used under a severe condition and, if used for a long period of time, chemically degrades at high temperatures and thereby the strength of the filter cloth decreases. Furthermore, it has been disclosed that the tensile strength of a polyphenylene sulfide fiber having an excellent tensile strength decreases less from chemical degradation at high temperatures (refer to Patent Document 3).

Furthermore, although examples in this patent document only describe a case in which a particulate E2280 manufactured by Toray Industries, Inc. is used, even this particulate is not enough to suppress the decrease with time in tensile strength from chemical degradation. That is, it has been believed that important things for a filter cloth used as a bag filter are mechanical strength and dimension stability of the filter cloth, and, in addition, regarding chemical degradation at high temperatures, it is important to suppress a decrease with time in tensile strength.

PRIOR ART DOCUMENTS

Patent Documents

Patent Document 1: JP 4-222217 A
Patent Document 2: JP 2764911 B1
Patent Document 3: JP 2008-266869 A

SUMMARY OF THE INVENTION

Problems to be Solved by the Invention

However, the present inventors have found that it is important for a bag filter cloth not to be broken when an external force is periodically applied by pulse jet or the like, and, to this end, it is necessary to not only suppress a decrease with time in tensile strength but also suppress, for shock absorption, a decrease with time in tensile elongation. That is, the present inventors have found that, regarding chemical degradation at high temperatures, it is important to suppress a decrease with time in toughness, which is the product of tensile strength and tensile elongation which are fiber properties. That is, the present inventors assumed that, for the purpose of suppressing a decrease in toughness of a filter cloth from long-term use, a PPS fiber is necessary which is less prone to a toughness decrease with time from chemical degradation at high temperatures. However, conventional techniques were still not enough to suppress a decrease with time in toughness from chemical degradation at high temperatures.

In view of the circumstances, an object of the present invention is to provide a PPS fiber that is suitable for use as a bag filter and whose tensile strength and toughness decrease less with time from chemical degradation at high temperatures.

Solutions to the Problems

That is, the present invention provides a polyphenylene sulfide fiber made from a polyphenylene sulfide resin having a weight average molecular weight of 50000 or more and 80000 or less, the polyphenylene sulfide fiber having a rigid amorphous content of 50% or more and a crystallite size in a direction of a (111) crystal plane of 5 nm or more.

According to a preferred aspect of the polyphenylene sulfide fiber of the present invention, the tensile strength is 5.0 cN/dtex or more and the rate of decrease in toughness after a 24-week heat treatment at a temperature of 180° C. is 30% or less.

In the present invention, it is possible to produce a filter cloth with the use of the above polyphenylene sulfide fiber.

Furthermore, a method for producing a polyphenylene sulfide fiber of the present invention includes: melting a polyphenylene sulfide resin having a weight average molecular weight of 50000 or more and 80000 or less at 280(° C. or higher and 340(° C. or lower and extruding the polyphenylene sulfide resin through a spinneret into an undrawn yarn, collecting the undrawn yarn at a haul-off rate of 500 m/minute or more and 5000 m/minute or less, and then hot-drawing the undrawn yarn at 2 times or more and 4 times or less, subjecting the yarn to a fixed-length heat treatment at 190(° C. or higher and 270(° C. or lower for 4 seconds or longer and 12 seconds or shorter, and thereafter subjecting the yarn to a relaxed heat treatment at 50 (° C. or higher and 150 (° C. or lower for 5 minutes or longer and 60 minutes or shorter and imparting crimp, and cutting the yarn into a predetermined length.

Effects of the Invention

According to the present invention, it is possible to obtain a PPS fiber which is suitable for use as a bag filter and whose tensile strength and toughness decrease less with time from chemical degradation at high temperatures.

EMBODIMENTS OF THE INVENTION

A polyphenylene sulfide fiber of the present invention is a polyphenylene sulfide fiber made from a polyphenylene sulfide resin having a weight average molecular weight of 50000 or more and 80000 or less, the polyphenylene sulfide fiber having a rigid amorphous content of 50% or more and a crystallite size in a direction of a (111) crystal plane of 5 nm or more.

PPS used in the present invention means a polymer that contains, as a repeating unit, a phenylene sulfide unit such as a p-phenylene sulfide unit represented by the following structural formula (I) or a m-phenylene sulfide unit.

[Chemical formula 1]

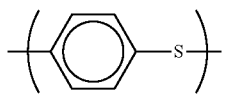
(I)

The PPS may be a homopolymer or a copolymer that has both the p-phenylene sulfide unit and the m-phenylene sulfide unit. Alternatively, provided that the effects of the present invention are not impaired, the PPS may be a copolymer or mixture that contains another aromatic sulfide.

Preferred for use as a PPS resin used in the present invention is, in terms of heat resistance and durability, a PPS resin that contains preferably 70 mol % or more, more preferably 90 mol % or more of p-phenylene sulfide units constituted of the repeating unit represented by the above structural formula (I). In this case, it is preferable that the copolymerization components other than the p-phenylene sulfide units in the PPS resin be m-phenylene sulfide units and/or some other aromatic sulfide units.

Examples of a commercially available PPS resin include "TORELINA" (registered trademark) manufactured by Toray Industries, Inc., "FORTRON" (registered trademark) manufactured by Polyplastics Co., Ltd. and the like.

It is important that the weight average molecular weight of the PPS resin forming the PPS fiber of the present invention be 50000 or more and 80000 or less. The weight average molecular weight is preferably 50500 or more, more preferably 51000 or more. Furthermore, the weight average molecular weight is preferably 70000 or less, 600000 or less.

In the case where a PPS resin having a weight average molecular weight of less than 50000 is used, as described later, it becomes difficult to achieve a preferable rigid amorphous content and (111) crystallite size, and the resulting fiber will be a fiber which shows poor heat resistance when subjected to a long-term heat treatment. On the other hand, in the case where a PPS resin having a weight average molecular weight of more than 80000 is used, the viscosity during melting will be too high and spinning faults such as yarn breakage would occur and it becomes difficult to obtain a fiber of good quality.

An effective way to develop the strength of a fiber is to increase the crystalline content of the fiber. The crystalline content is checked generally by, for example, a method of calculation from the amount of heat of fusion only by use of a DSC. However, a fiber obtained by drawing a PPS fiber without leaving an undrawn portion when drawing shows, in many cases, no clear difference in the amount of heat of fusion in the DSC, even in the case where the strength is shown to be clearly different. In view of this, the present inventors have found that, as an alternative to degree of crystallinity, rigid amorphous content contributes to the development of the strength of the fiber.

"Rigid amorphous" means the state of a polymer between crystalline and perfect amorphous states. It was found that, in fibers, the rigid amorphous is, as with a crystalline portion, one of the factors in developing strength, and shows a clear relationship with the strength and durability, etc. The present inventors have found that, by increasing the rigid amorphous content, it is possible to obtain a fiber having excellent durability and heat resistance as compared to conventional fibers.

Furthermore, it is important for the PPS fiber of the present invention to have a rigid amorphous content of 50% or more, and the rigid amorphous content is preferably 55% or more. In the case where the rigid amorphous content is less than 50%, as described later, it becomes difficult to obtain the ability to keep toughness. On the other hand, the upper limit of the rigid amorphous content that can be achieved as the internal structure in the PPS fiber is believed to be around 65%.

Furthermore, the present inventors have found that, in the present invention, the (111) crystallite size, which is found by wide angle X-ray diffraction, is closely related to the strength of a fiber as with the rigid amorphous content.

In the PPS fiber of the present invention, it is important that the crystallite size in the direction of the (111) crystal plane be 5 nm or more, preferably 5.2 nm or more, even more preferably 5.4 nm or more. In the case where the crystallite size in the direction of the (111) crystal plane is less than 5 nm, it becomes difficult to obtain the ability to keep toughness, as described later. On the other hand, the upper limit of the crystallite size in the direction of the (111) crystal plane that can be achieved as the internal structure in the PPS fiber is preferably 8 nm or less. With the crystallite size of preferably 8 nm or less, more preferably 7 nm or less, a resin with an extremely high viscosity is not necessary, occurrences of spinning faults such as yarn breakage can be suppressed, and good fibers can be obtained.

For the purpose of obtaining the PPS fiber of the present invention, the rigid amorphous content should be 50% or more and, at the same time, the crystallite size in the direction of the (111) crystal plane should be 5 nm or more. In the case where the (111) crystallite size is less than 5 nm although the rigid amorphous content is 50% or more, or in the case where the rigid amorphous content is less than 50% although the (111) crystallite size is 5 nm or more, the ability to keep toughness is low and durability is poor and therefore it is not possible to obtain a fiber that serves as an object of the present invention.

The tensile strength of the PPS fiber of the present invention is preferably 5.0 cN/dtex or more, more preferably 5.2 cN/dtex, even more preferably 5.3 cN/dtex or more. In the case where the tensile strength is less than 5.0 cN/dtex, it may be impossible to obtain a PPS fiber of the present invention which can withstand the use at high temperatures over a long period of time.

Furthermore, the rate of decrease in toughness after a 24-week heat treatment at a temperature of 180° C. is preferably 30% or less, more preferably 28% or less, even more preferably 25%. A PPS fiber with a rate of decrease of more than 30% may not be considered the PPS fiber of the present invention which can withstand the use at high temperatures over a long period of time. It should be noted that, although Patent Document 3 employs a 2000-hour treatment at a temperature of 200° C. as an indicator of the tensile strength from chemical degradation during long-term use, the temperature range in which a bag filter is actually used is 160° C. to 180° C., and the bag filter is used over several years. Therefore, the rate of decrease in toughness after a 24-week (approximately 4000 hours) heat treatment at a temperature of 180° C. in the present invention can serve as an indicator for evaluating the proper tensile strength from chemical degradation.

As described later, the present inventors have succeeded in obtaining a PPS fiber having a rigid amorphous content of 50% or more and a (111) crystallite size of 5 nm or more, which had not been obtained by conventional techniques. The present inventors have then found that, by use of a PPS fiber having a certain rigid amorphous content and a certain (111) crystallite size, it is possible to achieve a suitable rate of decrease in toughness after a 24-week heat treatment at a temperature of 180° C. That is, the present inventors have found that, although the use of a PPS resin having a rigid amorphous content of less than 50% or a (111) crystallite size of less than 5 nm cannot give a PPS fiber in which the rate of decrease in toughness after a 24-week heat treatment at a temperature of 180° C. is 30% or less, surprisingly, the use of a fiber made from a PPS resin having a rigid amorphous content of 50% or more and a (111) crystallite size of 5 nm or more can give a PPS fiber in which the rate of decrease in toughness after a 24-week heat treatment at a temperature of 180° C. is 30% or less.

The following description discusses an example of a method for producing a PPS fiber of the present invention.

A PPS resin as above, which has a weight average molecular weight of 50000 or more and 80000 or less, is melted, extruded through a spinneret into an undrawn yarn, and the undrawn yarn is collected preferably at a spinning rate of 500 m/minute or more, more preferably at 600 m/minute or more. At a haul-off rate of 500 m/minute or more, orientation increases to a certain extent, and the foregoing rigid amorphous content and (111) crystallite size are likely to result. The upper limit of the spinning rate is preferably approximately 5000 m/minute, more preferably 4000 m/minute or less.

Next, the obtained undrawn yarn is hot-drawn. The hot drawing is generally performed in hot water having a temperature of 90° C. to 98° C., and preferably employs a draw ratio of 2 times to 4 times, more preferably 3 times to 4 times. Examples of heating methods for drawing, other than hot water, include dry heat, steam and the like.

After the hot drawing, a fixed-length heat treatment is performed, whereby the crystallization of the fiber further proceeds and the rigid amorphous content also increases. A conventional fixed-length heat treatment means performing a heat treatment while keeping the length of a line of yarn substantially constant. Usually, the fixed-length heat treatment is to perform a heat treatment in a state in which the distance between a plurality of rollers whose circumferential velocities are substantially the same is one fixed length and at least part of the rollers is a heating roller or a heating means is separately provided. According to the fixed-length heat treatment of the present invention, the length of a line of yarn does not necessarily have to be kept substantially constant like the conventional fixed-length heat treatment, and may be 0.90× to 1.10×. The length is preferably 0.95× to 1.05×, even more preferably 0.99× to 1.01×. Furthermore, the length does not have to be 0.9× to 1.1× between every two rollers. The length(s) between some rollers may be less than 0.9× or more than 1.1×.

The present inventors have found that, by subjecting a fiber made from a PPS resin having a certain weight average molecular weight to the fixed-length heat treatment, it is possible to achieve a suitable rigid amorphous content and (111) crystallite size. That is, the present inventors have found that, although it is not possible to obtain a PPS fiber having a rigid amorphous content of 50% or more and a (111) crystallite size of 5 nm or more even by subjecting a fiber made from a PPS resin having a weight average molecular weight of less than 50000 to the fixed-length heat treatment, surprisingly, it is possible to obtain the PPS fiber having a rigid amorphous content of 50% or more and a (111) crystallite size of 5 nm or more by subjecting a fiber made from a PPS resin having a weight average molecular weight of 50000 or more to the fixed-length heat treatment. The fixed-length heat treatment temperature is preferably 190° C. or higher and 270° C. or lower. At a fixed-length heat treatment temperature of preferably 190° C. or higher, more preferably 200° C. or higher, even more preferably 220° C. or higher, it is possible to suitably impart the foregoing rigid amorphous content and (111) crystallite size to the fiber made from the PPS resin having a weight average molecular weight of 50000 or more. On the other hand, at a fixed-length heat treatment temperature of preferably 270° C. or lower, more preferably 240° C. or lower, it is possible to suitably suppress pseudo adhesion between fibers.

Furthermore, the fixed-length heat treatment time is preferably 5 seconds or longer. With a fixed-length heat treatment time of 5 seconds or longer, the crystallization of a fiber is promoted. In the case where the fixed-length treatment time is shorter than 5 seconds, it may be impossible to obtain a sufficient rigid amorphous content and (111) crystallite size. On the other hand, also in the case where the fixed-length heat treatment time is too long, the degree of crystallinity of the fiber is saturated. Therefore, the upper limit of the fixed-length heat treatment time is preferably approximately 12 seconds. Next, crimp is imparted to a line of yarn relaxed after the fixed-length heat treatment, with the use of a stuffing-box crimper or the like. Furthermore, when crimp is imparted, the crimp may be heat-set with steam, etc. In order to fix the crimped state of a line of yarn of the PPS fiber that has already been crystallized by the fixed-length heat treatment, it is important to employ, as the temperature for crimping, a temperature equal to or higher than the fixed-length heat treatment temperature. However, if the temperature of steam is too high, fibers may be fused to each other.

After that, according to need, an oil is preferably added in an amount of 0.01% by mass to 3.0% by mass with respect to the amount of fibers, and a relaxed heat treatment is performed preferably at a temperature of 50° C. to 150° C. for 5 minutes to 60 minutes. Then, the fiber is cut into a predetermined length, whereby a PPS staple fiber is obtained. The order of these steps may be changed according to need.

The PPS staple fiber thus obtained generally has a single fiber fineness of approximately 0.01 dtex to 20 dtex, a tensile strength of 5.0 cN/dtex or more, preferably 5.3 cN/dtex or more, and a tensile elongation of 10% to 100%, preferably 20% to 60%, and is suitable for use as a filter cloth for a bag filter.

As a filter cloth for a bag filter, a form of a nonwoven fabric is usually employed. A nonwoven fabric can be obtained by a nonwoven fabric producing method such as a wet method, a needle punch method or a water-jet punch method. The single fiber fineness, fiber length, etc. of a PPS staple fiber to be used are determined according to how the nonwoven fabric is produced. For example, the wet method in many cases requires short fibers having a fineness of as fine as 0.01 dtex to 1 dtex and a fiber length of approximately 0.5 mm to 15 mm, and the needle punch method in many cases requires short fibers having a fineness of 2 dtex to 15 dtex and a fiber length of 38 mm to 76 mm. Other than a nonwoven fabric, the PPS staple fiber of the present invention can also be made into a spun yarn and then the spun yarn can be made into a fabric such as a woven fabric or knitted fabric.

EXAMPLES

Measuring Methods (1) Tensile Strength and Tensile Elongation

Using a tensile tester ("TENSILON" manufactured by ORIENTEC Co., LTD.), the method described in JIS L1015 (2010) was performed under a condition in which the length of a sample was 2 cm and the tension speed was 2 cm/minute to find a stress-strain curve. From these, tensile strength and tensile elongation at breakage were found.

(2) Toughness

Using the tensile strength (cN/dtex) and tensile elongation (%) obtained in the above (1), toughness was found through the following equation.

Toughness=Tensile strength×(Tensile elongation)$^{1/2}$ (3) Rate of Decrease in Toughness A PPS fiber which was a measurement target was measured for toughness "a" before a long-term heat treatment and toughness "b" after the long-term heat treatment, by the above (1) and (2). The long-term heat treatment was performed at a temperature of 180° C. for 24 weeks with a hot air dryer. The rate of decrease in toughness was calculated from the toughness "a" and the toughness "b" before and after the long-term heat treatment, through the following equation.

Rate of decrease in toughness(%)=((a−b)/a)×100 a: Toughness before long-term heat treatment
b: Toughness after treatment at a temperature of 180° C. for 24 weeks (4) Method for Measuring Weight Average Molecular Weight The weight average molecular weight of PPS was calculated based on polystyrene by gel permeation chromatography (GPC), which is a kind of size exclusion chromatography (SEC). The conditions for the measurement by GPC were as follows.

Apparatus: SSC-7100 manufactured by Senshu Scientific co., ltd.
Column name: GPC3506 manufactured by Senshu Scientific co., ltd.
Eluent: 1-chloronaphthalene
Detector: Differential refractive index detector
Temperature of column: 210° C.
Temperature of pre-constant temperature bath: 250° C.
Temperature of pump constant temperature bath: 50° C.
Temperature of detector: 210° C.
Flow rate: 1.0 mL/minute
Sample injection amount: 300 μL (in the form of slurry: approximately 0.2% by weight)

(5) Rigid Amorphous Content

A measurement was performed with the use of differential scanning calorimetry (DSC) Q1000 manufactured by TA Instruments under the following condition, whereby the amount of heat of fusion (ΔHm) and the amount of heat of cold crystallization (ΔHc) were found. The ΔHm and ΔHc were the maximum values of peaks of the chart obtained by the measurement. The temperature-modulated DSC with the same apparatus was measured under the following condition, additional lines were drawn from baselines before and after the glass transition temperature (Tg) on the obtained chart, and the difference between them was used as a specific heat difference (ΔCp). The difference between the amount of heat of fusion (ΔHm) and the amount of heat of cold crystallization (ΔHc) was divided by the amount of heat of fusion (ΔHm$^0$) of perfect crystalline PPS through the following equation (1), whereby a degree of crystallinity (Xc) was found. Furthermore, the specific heat difference (ΔCp) between before and after the Tg was divided by the specific heat difference between before and after Tg of perfect amorphous PPS through the following equation (2), whereby a mobile amorphous content (Xma) was found. Moreover, a rigid amorphous content (Xra) was calculated by subtracting the degree of crystallinity (Xc) and the mobile amorphous content (Xma) from total through the following equation (3).

<DSC>
Atmosphere: Nitrogen flow (50 mL/minute)
Temperature/heat quantity calibration: High-purity indium
Specific heat calibration: Sapphire
Temperature range: 0° C. to 350° C.
Heating rate: 10° C./minute
Amount of sample: 5 mg
Sample container: Standard aluminum container <Temperature-Modulated DSC>
Atmosphere: Nitrogen flow (50 mL/minute)
Temperature/heat quantity calibration: High-purity indium
Specific heat calibration: Sapphire
Temperature range: 0° C. to 250° C.
Heating rate: 2° C./minute
Amount of sample: 5 mg
Sample container: Standard aluminum container $$Xc(\%)=(\Delta Hm-\Delta Hc)/\Delta Hm^0 \times 100 \qquad (1)$$

$$Xma(\%)=\Delta Cp/\Delta Cp^0 \times 100 \qquad (2)$$

$$Xra(\%)=100-(Xc+Xma) \qquad (3)$$

Here,
ΔHm⁰: Amount of heat of fusion of perfect crystalline PPS (146.2 J/g)
ΔCp⁰: Specific heat difference between before and after Tg of perfect amorphous PPS (0.2699 J/g° C.).

(6) Crystallite Size in Direction of (111) Crystal Plane

Weighed were 20 mg of samples of a PPS fiber cut into lengths of 4 cm, the samples were bundled with fiber axes aligned, and measured by wide angle X-ray diffraction (transmission method). The measurement was performed under the following condition.

X-ray generator: Model 4036A2 manufactured by Rigaku Corporation
X-ray source: CuKα line (with Ni filter)
Output: 40 kV-20 mA
Goniometer: Model 2155D manufactured by Rigaku Corporation
Slit: 2 mm in diameter 1° width 1° height
Detector: Scintillation counter
Attachment: Fiber sample stage manufactured by Rigaku Corporation
Counter-recorder: Model RAD-C manufactured by Rigaku Corporation
Scanning method: 2θ-θ step scan
Measuring range (2θ): 5° to 60°
Measuring step (2θ): 0.05°
Measuring time: 2 seconds
Scanning method: β step scan
Diffraction peak: around 2θ=20°
Measuring range (2θ): 90° to 270°
Measuring step (2θ): 0.5°
Measuring time: 2 seconds On the basis of the results of the measurement by wide angle X-ray diffraction, the crystallite size was calculated using the following equation.

$$\text{Crystallite size(nm)} = \lambda/\beta \cos\theta$$

Here, $\lambda$, $\beta$, $\beta_e$ and $\beta_o$ are as follows:
$\lambda = 0.15418$ nm
$\beta = (\beta_e^2 - \beta_o^2)^{1/2}$
$\beta_e$: Half-width of diffraction peak
$\beta_o$: Correction value for half-width (0.6°)

Example 1

Using a twin screw extruder with a vent (model TEX30 manufactured by The Japan Steel Works, LTD.) configured such that the degree of vacuum was 1.3 kPa and cylinder temperature was 290° C., a PPS particulate E2180 (weight average molecular weight: 51500) manufactured by Toray Industries, Inc. was melted at a screw speed of 160 rpm, extruded through a round opening (open area: 15.9 mm²), and cut into lengths of 3 mm with a strand cutter, whereby pellets were obtained. The obtained pellets were dried in a vacuum at a temperature of 160° C. for 5 hours.

The pellets obtained in the above manner were fed to an extruder type spinning machine, melt-spun at a spinning temperature of 320° C. and a discharge rate of 400 g/minute, and hauled at a haul-off rate of 800 m/minute, whereby an undrawn yarn was obtained. The obtained undrawn yarn was drawn in hot water having a temperature of 95° C. at a draw ratio of 3.4 times, and treated at a fixed-length heat treatment temperature of 240° C. for 9 seconds, and thereafter provided with crimp with a stuffing-box crimper, dried, provided with an oil, and cut to obtain a PPS staple fiber.

Example 2

The same processes as in Example 1 were performed, except that the fixed-length heat treatment temperature was changed as shown in Table 1. In this way, a PPS staple fiber was obtained.

Example 3

The same processes as in Example 1 were performed, except that the fixed-length heat treatment time was changed as shown in Table 1. In this way, a PPS fiber was obtained.

Example 4

The same processes as in Example 1 were performed, except that the resin weight average molecular weight, the hot draw ratio and the fixed-length heat treatment time were changed as shown in Table 1. In this way, a PPS fiber was obtained.

Example 5

The same processes as in Example 1 were performed, except that the resin weight average molecular weight was changed as shown in Table 1. In this way, a PPS fiber was obtained.

Comparative Example 1

The same processes as in Example 1 were performed, except that the resin weight average molecular weight was changed as shown in Table 1. In this way, a PPS fiber was obtained.

Comparative Example 2

The same processes as in Example 1 were performed, except that the fixed-length heat treatment temperature was changed as shown in Table 1. In this way, a PPS fiber was obtained.

Comparative Example 3

The same processes as in Example 1 were performed, except that the resin weight average molecular weight and the fixed-length heat treatment temperature and time were changed as shown in Table 1. In this way, a PPS fiber was obtained.

Comparative Example 4

The same processes as in Example 1 were performed, except that the resin weight average molecular weight and draw ratio were changed as shown in Table 1. In this way, a PPS fiber was obtained.

Comparative Example 5

The same processes as in Example 1 were performed, except that the resin weight average molecular weight and the fixed-length heat treatment time were changed as shown in Table 1. In this way, a PPS fiber was obtained.

The PPS fibers obtained in the above manner were each measured in accordance with the foregoing [Measuring methods]. The results of the measurement are shown in Table 1 below.

TABLE 1

| | | | Example 1 | Example 2 | Example 3 | Example 4 | Example 5 | Comparative Example 1 | Comparative Example 2 | Comparative Example 3 | Comparative Example 4 | Comparative Example 5 |
|---|---|---|---|---|---|---|---|---|---|---|---|---|
| Material | Resin weight average molecular weight | — | 51500 | 51500 | 51500 | 53000 | 50500 | 49500 | 51500 | 49500 | 49500 | 49500 |
| Fiber Conditions | Spinning temperature | °C. | 320 | 320 | 320 | 320 | 320 | 320 | 320 | 320 | 320 | 320 |
| | Discharge rate | g/min. | 400 | 400 | 400 | 400 | 400 | 400 | 400 | 400 | 400 | 400 |
| | Haul-off rate | m/min. | 800 | 800 | 800 | 800 | 800 | 800 | 800 | 800 | 800 | 800 |
| | Hot draw ratio | times | 3.4 | 3.4 | 3.4 | 3.2 | 3.4 | 3.4 | 3.4 | 3.4 | 3.6 | 3.4 |
| | Fixed-length heat treatment temperature | °C. | 240 | 220 | 240 | 220 | 240 | 240 | 150 | — | 240 | 240 |
| | Fixed-length heat treatment time | sec. | 9 | 9 | 5 | 9 | 9 | 9 | 9 | — | 9 | 18 |
| Physical properties Fiber | Tensile strength (before heat treatment) | cN/dtex | 5.5 | 5.3 | 5.4 | 5.3 | 5.1 | 5.0 | 4.7 | 4.1 | 5.1 | 5.1 |
| | Rigid amorphous content | % | 60 | 56 | 59 | 58 | 52 | 34 | 47 | 43 | 51 | 45 |
| | (111) plane crystallite size | nm | 5.7 | 5.5 | 5.7 | 5.9 | 5.2 | 4.6 | 3.2 | 2.2 | 4.8 | 5.0 |
| | Single fiber fineness | dtex | 2.1 | 2.2 | 2.3 | 2.1 | 2.2 | 2.2 | 2.1 | 2.2 | 2.2 | 2.3 |
| | Fiber length | mm | 51 | 51 | 51 | 51 | 51 | 51 | 51 | 51 | 51 | 51 |
| Performance | Rate of decrease in toughness | % | 20 | 23 | 22 | 21 | 28 | 39 | 43 | 59 | 34 | 37 |

The invention claimed is:

1. A polyphenylene sulfide fiber comprising a polyphenylene sulfide resin having a weight average molecular weight of 50500 or more and 53000 or less, the polyphenylene sulfide fiber having a rigid amorphous content of 50% or more and a crystallite size in a direction of a (111) crystal plane of 5 nm or more.

2. The polyphenylene sulfide fiber according to claim 1, wherein the tensile strength of the polyphenylene sulfide fiber is 5.0 cN/dtex or more and the rate of decrease in toughness of the polyphenylene sulfide fiber after a 24-week heat treatment at a temperature of 180° C. is 30% or less.

3. A filter cloth comprising the polyphenylene sulfide fiber recited in claim 1.

4. A method for producing a polyphenylene sulfide fiber, comprising: melting a polyphenylene sulfide resin having a weight average molecular weight of 50500 or more and 53000 or less at 280° C. or higher and 340° C. or lower and extruding the polyphenylene sulfide resin through a spinneret into an undrawn yarn, collecting the undrawn yarn at a haul-off rate of 500 m/minute or more and 5000 m/minute or less, and then hot-drawing the undrawn yarn at 2 times or more and 4 times or less, subjecting the yarn to a fixed-length heat treatment at 190° C. or higher and 270° C. or lower for 4 seconds or longer and 12 seconds or shorter, and thereafter subjecting the yarn to a relaxed heat treatment at 50° C. or higher and 150° C. or lower for 5 minutes or longer and 60 minutes or shorter and imparting crimp, and cutting the yarn into a predetermined length.

\* \* \* \* \*